(12) United States Patent
Jin et al.

(10) Patent No.: US 8,872,873 B2
(45) Date of Patent: Oct. 28, 2014

(54) LIGHT SCANNING UNIT AND IMAGE FORMING APPARATUS USING THE SAME

(71) Applicant: SAMSUNG Electronics Co., Ltd., Suwon-si (KR)

(72) Inventors: In-ho Jin, Gunpo-si (KR); Tae-kyoung Lee, Hwaseong-si (KR)

(73) Assignee: Samsung Electronics Co., Ltd, Suwon-si (KR)

( * ) Notice: Subject to any disclaimer, the term of this patent is extended or adjusted under 35 U.S.C. 154(b) by 0 days.

(21) Appl. No.: 13/732,513

(22) Filed: Jan. 2, 2013

(65) Prior Publication Data

US 2013/0176606 A1 Jul. 11, 2013

(30) Foreign Application Priority Data

Jan. 11, 2012 (KR) ........................ 10-2012-0003457

(51) Int. Cl.
| | | |
|---|---|---|
| B41J 15/14 | (2006.01) | |
| B41J 27/00 | (2006.01) | |
| G02B 26/08 | (2006.01) | |
| G03G 15/043 | (2006.01) | |
| G02B 26/12 | (2006.01) | |

(52) U.S. Cl.
CPC .......... *G03G 15/043* (2013.01); *G02B 26/0825* (2013.01); *G03G 15/0435* (2013.01); *G02B 26/126* (2013.01)
USPC .......................................... 347/242; 247/257

(58) Field of Classification Search
USPC .......... 347/230, 241–245, 256–261; 359/846, 359/847, 849, 862, 865, 868, 869, 871–876
See application file for complete search history.

(56) References Cited

U.S. PATENT DOCUMENTS

| | | | | |
|---|---|---|---|---|
| 7,453,487 B2 * | 11/2008 | Sato et al. | ...................... | 347/257 |
| 7,760,410 B2 * | 7/2010 | Kim | ........................... | 359/221.2 |
| 8,189,251 B2 * | 5/2012 | Narita | ........................ | 359/205.1 |
| 2006/0103906 A1 | 5/2006 | Sato et al. | | |
| 2009/0153934 A1 * | 6/2009 | Shoji | .......................... | 359/205.1 |

FOREIGN PATENT DOCUMENTS

| | | |
|---|---|---|
| EP | 2400348 | 12/2011 |
| JP | 08-146325 | 6/1996 |
| JP | 2001-228427 | 8/2001 |

(Continued)

OTHER PUBLICATIONS

European Search Report dated Jun. 27, 2014 issued in EP Application No. 12198562.6.

*Primary Examiner* — Hai C Pham
(74) *Attorney, Agent, or Firm* — Stanzione & Kim, LLP

(57) ABSTRACT

An image forming apparatus having a light scanning unit including a light source to emit a light beam; a deflector to deflect the light beam in a main scanning direction; an imaging lens to focus the light beam deflected by the deflector onto a photoconductor; at least one reflecting element to reflect the light beam that has passed through the imaging lens; and a bow control apparatus to correct a bow of a scanning line of the light beam, the bow control apparatus comprising first and second support units to support the reflecting element, first and second pressure units to pressure an inside and an outside of the reflecting element, respectively, and first and second adjusting elements to adjust the amount of pressure of the first and second pressure units, the bow control apparatus convexly or concavely bows the reflecting element to correct an image bow of a scanning line of the light beam.

26 Claims, 10 Drawing Sheets

(56) References Cited

FOREIGN PATENT DOCUMENTS

| JP | 2003-270573 | 9/2003 |
| JP | 2005-265904 | 9/2005 |
| JP | 2008-139353 | 6/2008 |
| JP | 2011-118161 | 6/2011 |

* cited by examiner

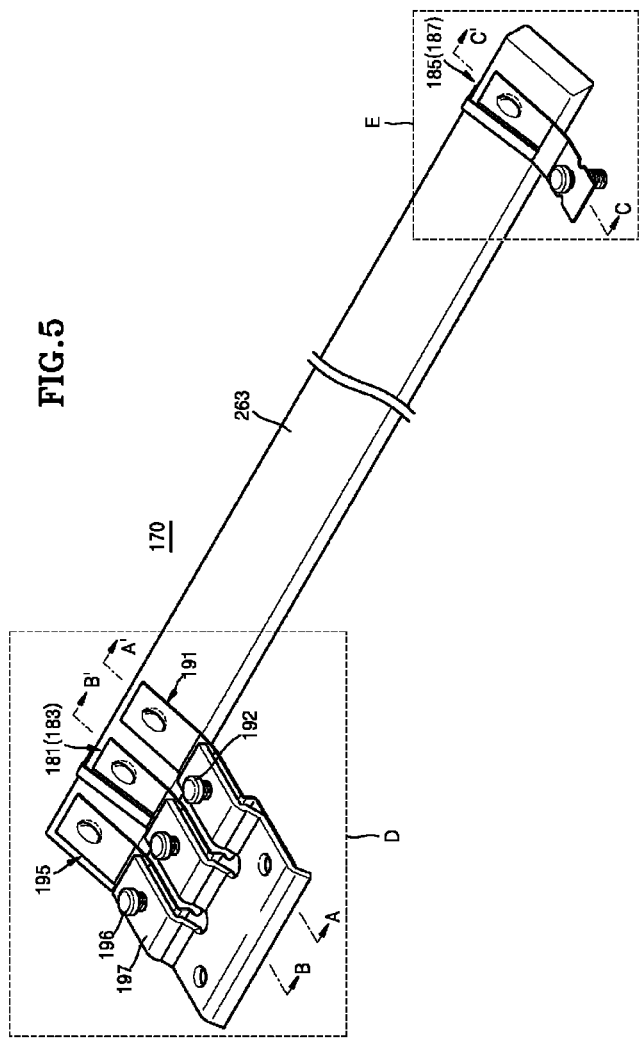

LIGHT SCANNING UNIT AND IMAGE FORMING APPARATUS USING THE SAME

CROSS-REFERENCE TO RELATED APPLICATIONS

This application claims the benefit of Korean Patent Application No. 10-2012-0003457, filed on Jan. 11, 2012, in the Korean Intellectual Property Office, the disclosure of which is incorporated herein in its entirety by reference.

BACKGROUND OF THE INVENTION

1. Field of the Invention

The present general inventive concept relates to a light scanning unit and an image forming apparatus employing the same, and more particularly, to a light scanning unit including a bow control apparatus to correct a bow of a scanning line of a light beam that is emitted from a light source and an image forming apparatus employing the light scanning unit.

2. Description of the Related Art

Light scanning units scan a laser beam onto a photoconductor to form an electrostatic latent image in an electrophotographic image forming apparatus such as a laser printer. The light scanning units include a light deflector that deflects a light beam emitted from a light source and scans the same onto a photoconductor, and an imaging optical system that is between the light deflector and the photoconductor and forms the deflected light beam as an image on the photoconductor.

In an electrophotographic image forming apparatus, when a light scanning unit scans a light beam onto a photoconductor such as a photosensitive drum, an electrostatic latent image is formed on the photoconductor by main scanning by the light scanning unit and sub-scanning by movement of the photoconductor. The electrostatic latent image is developed to form a developed image by using a development agent such as a toner, and the developed image is transferred onto a printing medium.

In the process in which an electrostatic latent image is formed on the photoconductor, a scanning line is not irradiated straight due to assembly deviation and flatness of optical components such as the imaging optical system and the like, an image bow having a convex shape and a concave shape is generated, and thus, image quality is deteriorated.

SUMMARY OF THE INVENTION

The present general inventive concept provides a light scanning unit to correct an image bow of a scanning line by using a reflecting element that reflects a light beam.

Additional features and utilities of the present general inventive concept will be set forth in part in the description which follows and, in part, will be obvious from the description, or may be learned by practice of the general inventive concept.

The present general inventive concept also provides an image forming apparatus employing the light scanning unit.

Exemplary embodiments of the present general inventive concept provide a light scanning unit including: a light source to emit a light beam according to an image signal; a deflector to deflect the light beam emitted from the light source in a main scanning direction; an imaging lens to focus the light beam deflected by the deflector onto a photoconductor; at least one reflecting element to reflect the light beam that has passed through the imaging lens; and a bow control apparatus to correct a bow of a scanning line of the light beam, wherein the bow control apparatus includes first and second support units to support both ends of the reflecting element, first and second pressure units to pressure the inside and the outside of the reflecting element, respectively, based on one of the first and second support units, and first and second adjusting elements to adjust the amount of pressure of the first and second pressure units, and thus, the bow control apparatus convexly or concavely bows the at least one reflecting element.

The first pressure unit may include a first pressure element to directly pressure the reflecting element and a first bracket that is fixed to a frame and extends to an upper portion of the first pressure element, and the second pressure unit may include a second pressure element to directly pressure the reflecting element and a second bracket that is fixed to the frame and extends to an upper portion of the second pressure element, wherein the first adjusting element may be installed in the first bracket to pressure the upper portion of the first pressure element, and the second adjusting element may be installed in the second bracket to pressure the upper portion of the second pressure element.

Areas of the first and second pressure elements, which contact the at least one reflecting element, may be formed in a hemisphere shape.

The first and second pressure elements may be leaf springs.

The first and second adjusting elements may be screws and may adjust the amount of pressure from the first and second pressure units through the rotation of the screws.

Each of the first and second support units may include a lower portion support element to support a lower portion of the reflecting element and an upper portion support element to support an upper portion of the reflecting element.

The upper portion support element may include a pressure unit to pressure the reflecting element, and a holder unit to prevent the reflecting element from separating from the first or second support unit.

The upper portion support element may be disposed between the first and second pressure units, and may be connected to the first and second pressure units.

The first and second pressure units and the upper portion support element disposed between them may be formed in one body of a leaf spring.

The first and second brackets may be formed in one body.

Exemplary embodiments of the present general inventive concept also provide an image forming apparatus including: a photoconductor; the light scanning unit, which forms an electrostatic latent image on the photoconductor; and a developing unit to develop the electrostatic latent image.

Exemplary embodiments of the present general inventive concept also provide a bow control apparatus of a light scanning unit including a first support unit disposed on a first side of a reflecting element and a second support unit disposed on a second side of the reflecting element to support the reflecting element, and a first pressure unit disposed on a first side of the first support unit and a second pressure unit disposed on a second side of the first support unit to pressure the reflecting element, the first and second pressure units including first and second adjusting elements, respectively, to adjust the amount of pressure to concavely and convexly bow the reflecting element to correct a bow of a scanning line formed on a photoconductor.

The first adjusting element may adjust the first pressure unit so that the first pressure unit pressures an inside of the reflecting element to concavely bow the reflecting element.

The second adjusting element may adjust the second pressure unit so that the second pressure unit pressures an outside of the reflecting element to convexly bow the reflecting element.

Each of the first and second support units may include lower portion support elements, an upper side of each of the lower portion support elements being aslope formed.

The first pressure unit may include a first pressure element to directly pressure the reflecting element and a first bracket disposed on the first pressure element, and the second pressure unit may include a second pressure element to directly pressure the reflecting element and a second bracket disposed on the second pressure element.

A first end of the first pressure element may be fixed to a frame of the light scanning unit and a second end of the first pressure element may contact the reflecting element to pressure it.

An area of the first pressure element, which contacts the reflecting element, may be formed in a hemisphere shape.

The first pressure element may be pressured by lowering the first adjusting element so that the first pressure element pressures an inside of the reflecting element through the area formed in a hemisphere shape.

A first end of the second pressure element may be fixed to a frame of the light scanning unit and a second end of the second pressure element may contact the reflecting element to pressure it.

An area of the second pressure element, which contacts the reflecting element, may be formed in a hemisphere shape.

The second pressure element may be pressured by lowering the second adjusting element so that the second pressure element pressures an outside of the reflecting element through the area formed in a hemisphere shape.

The first and second adjusting elements may be screws.

The first and second pressure units may include first and second pressure elements, respectively, and first and second brackets, respectively, the pressure units may be pressured by rotating the screws, the amount of pressure on the first and second pressure elements may be adjusted by adjusting the rotation of the screws.

The first pressure element and the second pressure element may be leaf springs.

BRIEF DESCRIPTION OF THE DRAWINGS

These and/or other features and utilities of the present general inventive concept will become apparent and more readily appreciated from the following description of the embodiments, taken in conjunction with the accompanying drawings of which:

FIG. 5 is a perspective view illustrating the bow control apparatus of FIGS. 4A and 4B;

DETAILED DESCRIPTION OF THE PREFERRED EMBODIMENTS

Figure 1:
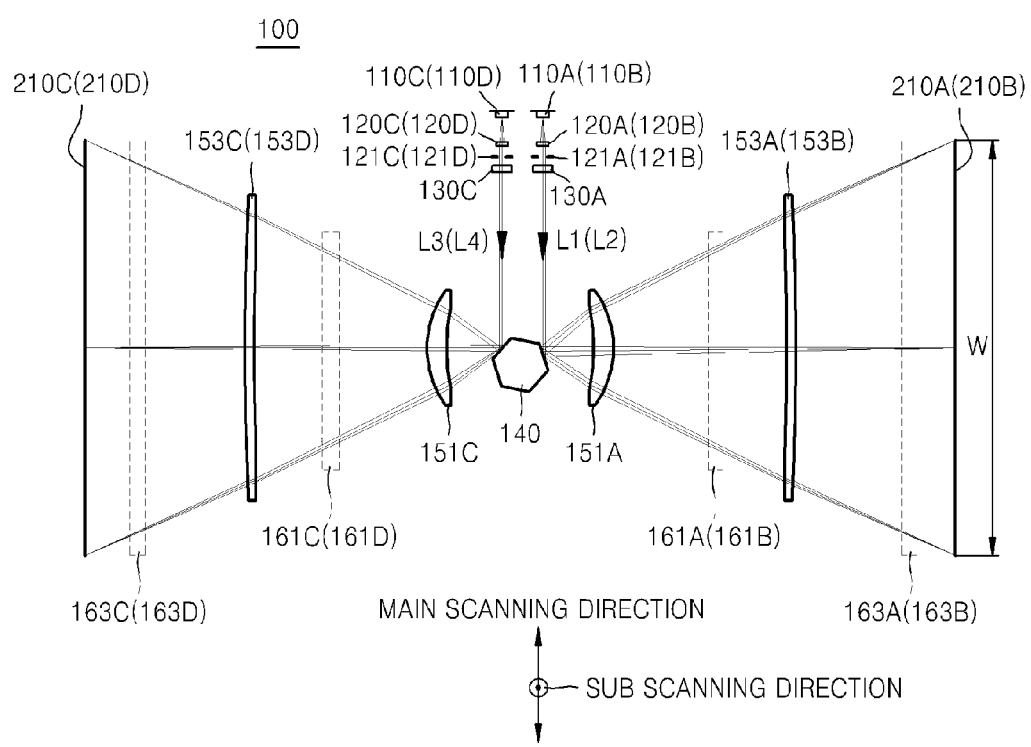
FIG. 1 is a plan view of a light scanning unit according to an embodiment of the present general inventive concept.

Reference will now be made in detail to the embodiments of the present general inventive concept, examples of which are illustrated in the accompanying drawings, wherein like reference numerals refer to the like elements throughout. The embodiments are described below in order to explain the present general inventive concept while referring to the figures.

Figure 2:
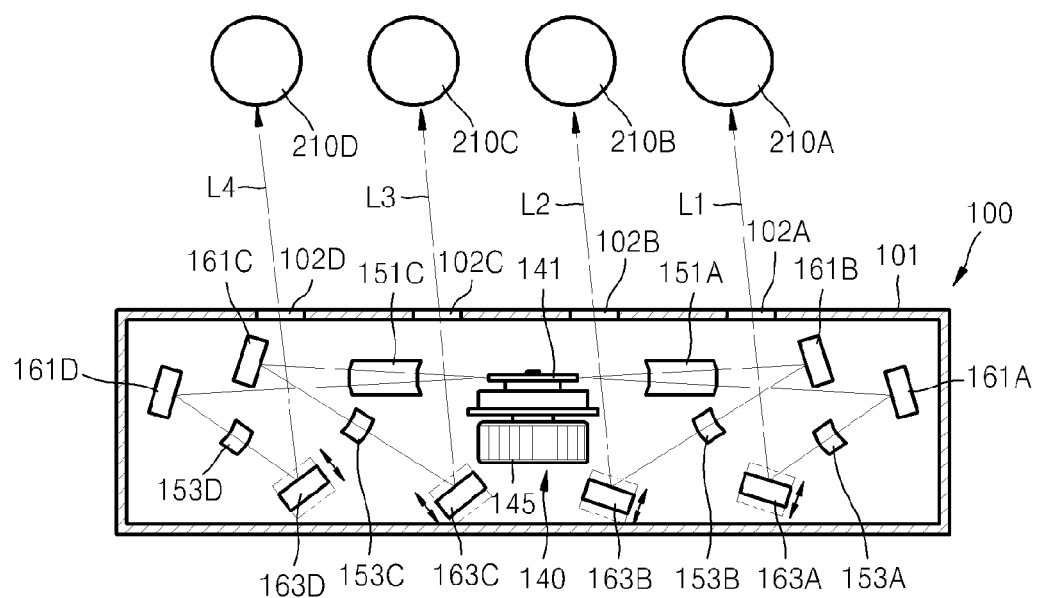
FIG. 2 is a view illustrating the light scanning unit of FIG. 1 with respect to a sub scanning plane.

FIG. 1 is a plan view of a light scanning unit 100 according to an embodiment of the present general inventive concept. FIG. 2 is a view illustrating the light scanning unit 100 of FIG. 1 with respect to a sub scanning plane. In FIG. 1, for convenience of description, changes in light paths due to reflecting elements, namely, first reflecting elements 161A, 161B, 161C, and 161D, and second reflecting elements 163A, 163B, 163C, and 163D, are ignored. In addition, FIG. 1 illustrates only one set of overlapping optical components due to a plurality of light beams, namely, first through fourth light beams L1, L2, L3, and L4, that are aslope incident on a deflector 140 in a sub-scanning direction.

Referring to FIGS. 1 and 2, the light scanning unit 100, which is a unit to scan the first through fourth light beams L1, L2, L3, and L4 in a main scanning direction, includes light sources 110A, 110B, 110C, and 110D, the deflector 140, and an imaging optical system.

The light sources 110A, 110B, 110C, and 110D, each of which irradiate a light beam, may include first and second light sources 110A and 110B disposed in a vertical direction and third and fourth light sources 110C and 110D disposed parallel with the first and second light sources 110A and 110B. However, the number and disposition form of the light sources are not limited thereto, and may be variously changed. The light sources 110A, 110B, 110C, and 110D may be disposed on a single board. The light sources, that is, the first through fourth light sources 110A, 110B, 110C, and 110D, may include laser diodes irradiating the first through fourth light beams L1, L2, L3, and L4, respectively. Each of the first through fourth light beams L1, L2, L3, and L4 emitted from the first through fourth light sources 110A, 110B, 110C, and 110D, respectively, may be aslope incident on the deflector 140 with respect to the sub-scanning direction.

Collimating lenses 120A and 120B to collimate the first and second light beams L1 and L2 and a cylindrical lens 130A to focus the first and second light beams L1 and L2 onto a deflection surface of the deflector 140 may be disposed between the first and second light sources 110A and 110B and the deflector 140 on the right side. At this time, the cylindrical lens 130A may be commonly used with respect to the first and second light beams L1 and L2. Similarly, collimating lenses 120C and 120D to collimate the third and fourth light beams L3 and L4 and a cylindrical lens 130C to focus the third and fourth light beams L3 and L4 onto a deflection surface of the deflector 140 may be disposed between the third and fourth light sources 110C and 110D and the deflector 140 on the left side. In addition, iris diaphragms 121A, 121B, 121C, and 121D may be disposed between the collimating lenses 120A, 120B, 120C, and 120D and the cylindrical lenses 130A and 130C to adjust diameters of the first through fourth light beams L1, L2, L3, and L4.

The deflector 140 may include a rotational polygon mirror 141 having a plurality of deflection surfaces, that is, a plurality of reflection surfaces, and a motor 145 to rotate the rotational polygon mirror 141. The deflector 140 deflects the first through fourth light beams L1, L2, L3, and L4, according to rotation of the rotational polygon mirror 141, in a main scanning direction. The deflector 140 of FIG. 1 has six deflection surfaces, but the present general inventive concept is not limited thereto.

The imaging optical system is an optical unit to focus each of the first through fourth light beams L1, L2, L3, and L4 deflected by the deflector 140 onto outer circumferences of photoconductors 210A, 210B, 201C, and 210D, that is, onto surfaces that are to be scanned. The imaging optical system may include optical components such as first imaging lenses 151A and 151C, second imaging lenses 153A, 153B, 153C, and 153D, the first reflecting elements 161A, 161B, 161C, and 161D, and the second reflecting elements 163A, 163B, 163C, 163D. The optical components of the imaging optical system may be symmetrically disposed at opposite sides of the deflector 140.

The first imaging lenses 151A and 151C and the second imaging lenses 153A, 153B, 153C, and 153D may be fθ lenses to focus the first through fourth light beams L1, L2, L3, and L4 deflected by the deflector 140 onto the photoconductors 210A, 210B, 201C, and 210D at a constant velocity. Optical designs of the first imaging lenses 151A and 151C and the second imaging lenses 153A, 153B, 153C, and 153D may vary according to distances between the deflector 140 and the photoconductors 210A, 210B, 210C, and 210D and positions of the first imaging lenses 151A and 151C and the second imaging lenses 153A, 153B, 153C, and 153D.

The first reflecting elements 161A, 161B, 161C, and 161D and the second reflecting elements 163A, 163B, 163C, and 163D are elements that change paths of the first through fourth light beams L1, L2, L3, and L4, as illustrated in FIG. 2. A reflection mirror or a total reflection prism may be used as the first reflecting elements 161A, 161B, 161C, and 161D and the second reflecting elements 163A, 163B, 163C, and 163D. The first reflecting elements 161A, 161B, 161C, and 161D and the second reflecting elements 163A, 163B, 163C, and 163D may have, for example, a bar type rectangular parallelepiped shape. The first reflecting elements 161A, 161B, 161C, and 161D and the second reflecting elements 163A, 163B, 163C, and 163D may control the change of paths of the first through fourth light beams L1, L2, L3, and L4 by adjusting angles of inclination thereof or by adjusting shapes of reflection surfaces thereof.

The first reflecting elements 161A, 161B, 161C, and 161D change paths of the first through fourth light beams L1, L2, L3, and L4, which have passed through the first imaging lenses 151A and 151C, in a direction of the second imaging lenses 153A, 153B, 153C, and 153D. The second reflecting elements 163A, 163B, 163C, and 163D change paths of the first through fourth light beams L1, L2, L3, and L4, which have passed through the second imaging lenses 153A, 153B, 153C, and 153D, in a direction of the photoconductors 210A, 210B, 210C, and 210D. By adjusting bows of the second reflecting elements 163A, 163B, 163C, and 163D, as illustrated by a dashed line in FIG. 2, it is possible to correct bows of scanning lines of the first through fourth light beams L1, L2, L3, and L4. A detailed explanation of the bows of the second reflecting elements 163A, 163B, 163C, and 163D is described below, and a group of the second reflecting elements 163A, 163B, 163C, and 163D is referred to as a reflecting element 163, for convenience's sake.

Figure 3A:
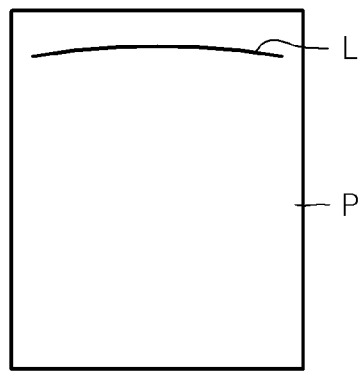
FIGS. 3A and 3B are diagrams illustrating a bow of a scanning line.
Figure 3B:
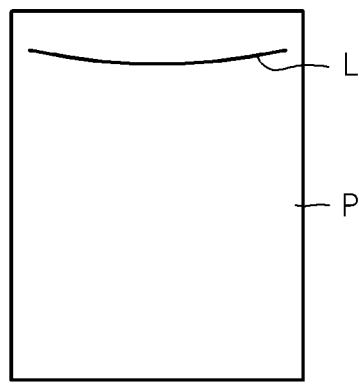

FIGS. 3A and 3B are diagrams illustrating a bow of a scanning line L.

The scanning line L formed in a recording medium P by a light scanning unit may be convexly bowed in a upper side direction, as illustrated in FIG. 3A, or concavely bowed in a lower side direction, as illustrated in FIG. 3B, due to assembly deviation and flatness of optical components such as the imaging optical system.

The light scanning unit 100 according to the current embodiment includes a bow control apparatus to convexly or concavely bow a reflecting element to correct a bow of the scanning line L.

Figure 4A:
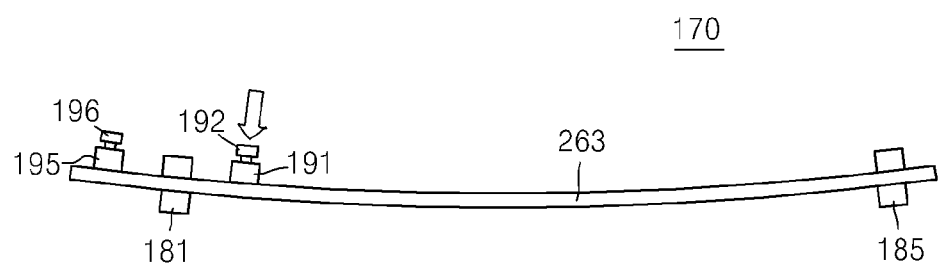
FIGS. 4A and 4B are conceptual diagrams schematically illustrating a bow control apparatus according to an embodiment of the present general inventive concept.
Figure 4B:
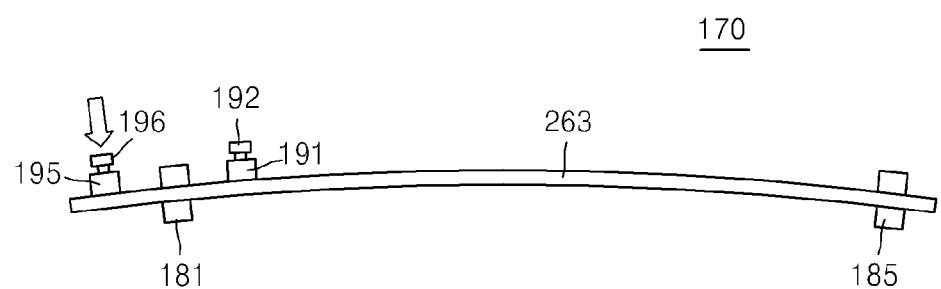

FIGS. 4A and 4B are conceptual diagrams schematically illustrating a bow control apparatus 170 according to an embodiment of the present general inventive concept.

As illustrated in FIGS. 4A and 4B, the bow control apparatus 170 includes first and second support units 181 and 185 to support a reflecting element 263, first and second pressure units 191 and 195 to pressure the reflecting element 263, and first and second adjusting elements 192 and 196 to adjust the amount of pressure.

The first and second support units 181 and 185 support both ends of the reflecting element 263. The first pressure unit 191 pressures the inside of the reflecting element 263, based on the first support unit 181, and the second pressure unit 195 pressures the outside of the reflecting element 263, based on the first support unit 181. The first adjusting element 192 adjusts the amount of pressure of the first pressure unit 191, and the second adjusting element 196 adjusts the amount of pressure of the second pressure unit 195.

The bow control apparatus 170 according to the current embodiment may concavely bow the reflecting element 263 in a lower side direction by using the first adjusting element 192 as illustrated in FIG. 4A so that the first pressure unit 191 pressures the inside of the reflecting element 263. In addition, the bow control apparatus 170 may convexly bow the reflecting element 263 in a upper side direction by using the second adjusting element 196 as illustrated in FIG. 4B so that the second pressure unit 196 pressures the outside of the reflecting element 263. In this manner, a bow of a scanning line convexly or concavely formed in a photoconductor is corrected.

Figure 6:
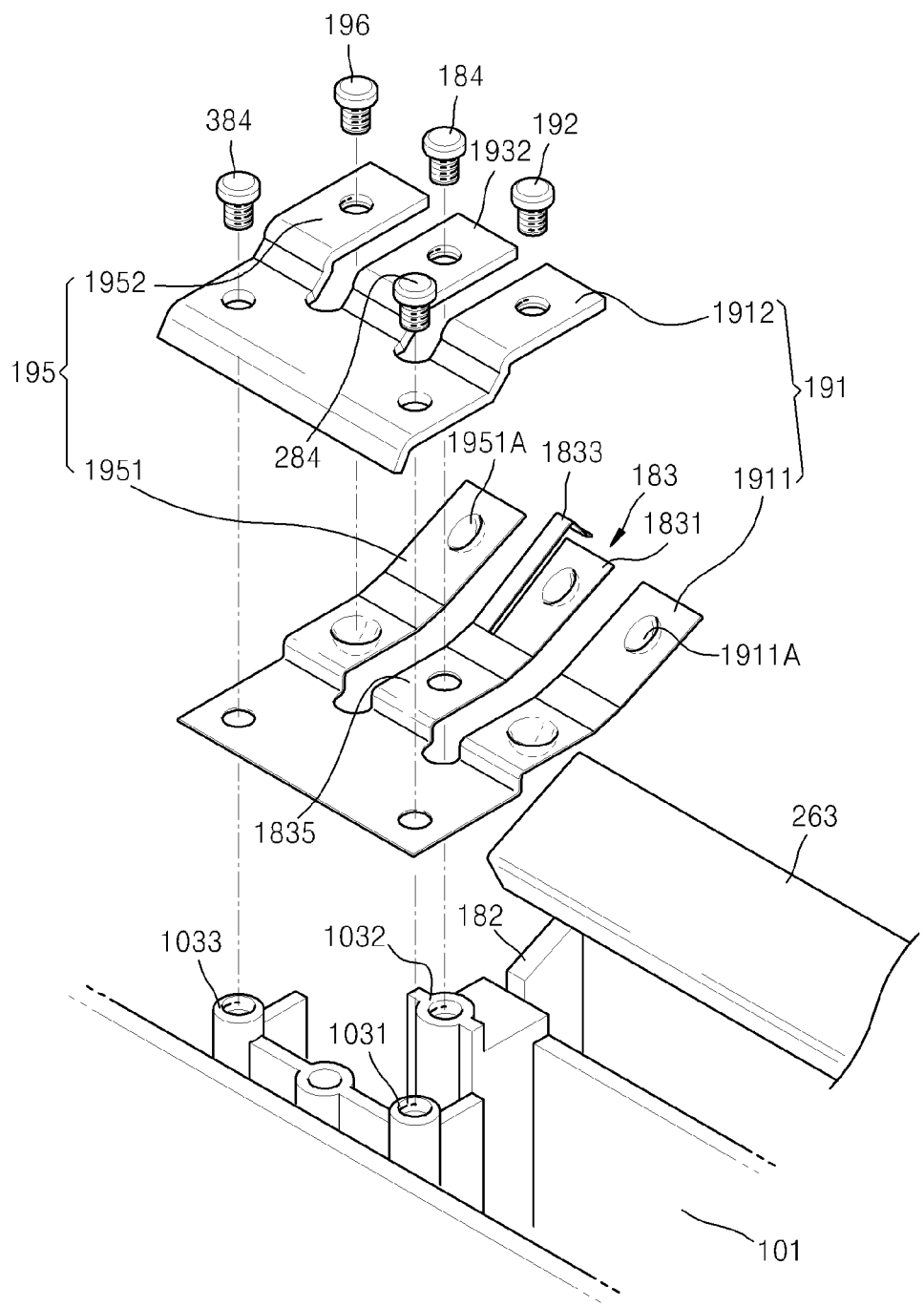
FIG. 6 is an exploded perspective view of a part "D" of FIG. 5.
Figure 7:
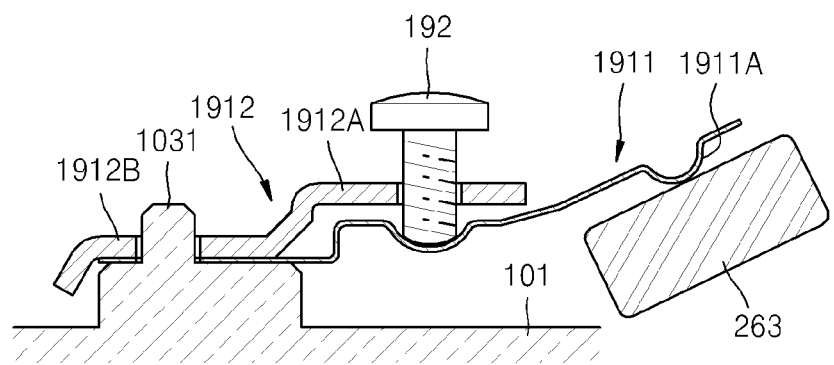
FIG. 7 is a cross-sectional view taken along the line A-A' of FIG. 5.
Figure 8:
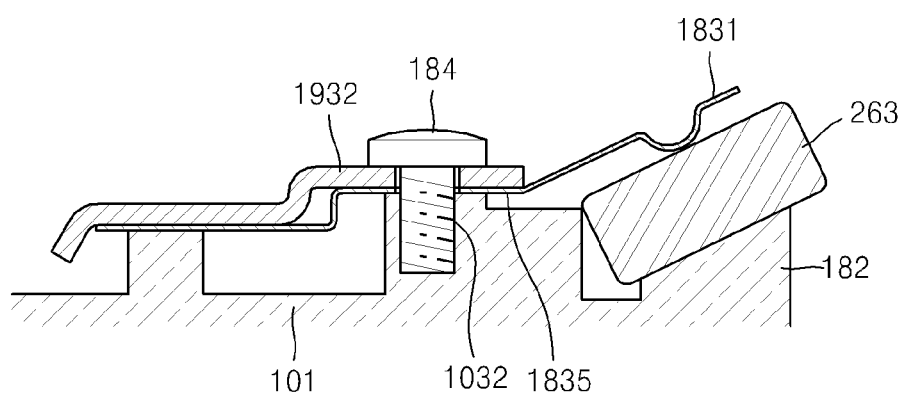
FIG. 8 is a cross-sectional view taken along the line B-B' of FIG. 5.
Figure 9:
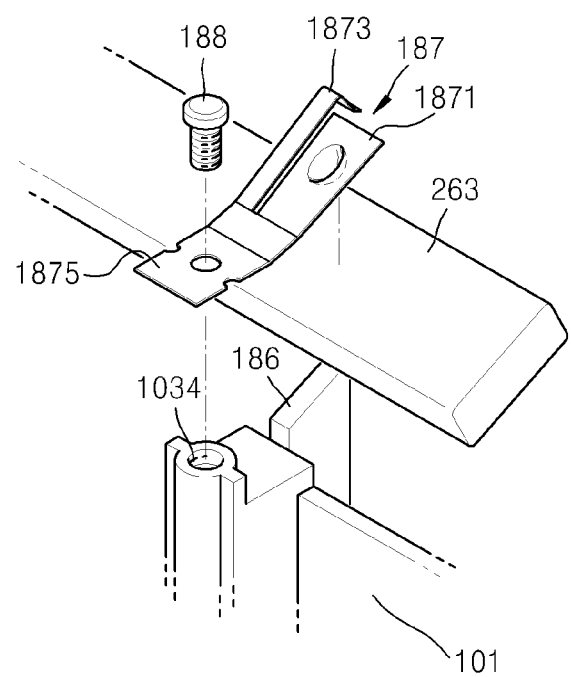
FIG. 9 is a magnified diagram of part "E" of FIG. 5.
Figure 10:
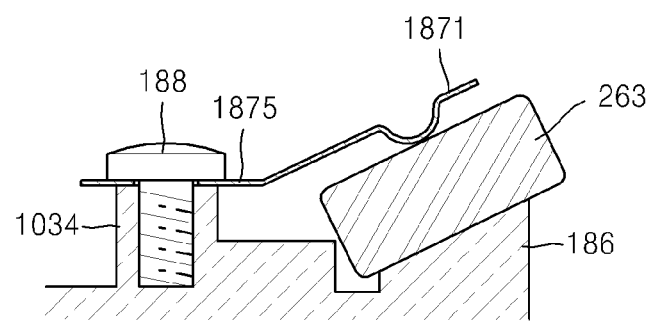
FIG. 10 is a cross-sectional view taken along the line C-C' of FIG. 5.

FIG. 5 is a perspective view illustrating the bow control apparatus 170 according the current embodiment of the present general inventive concept. FIG. 6 is an exploded perspective view of a portion "D" of FIG. 5, FIG. 7 is a cross-sectional view taken along the line A-A' of FIG. 5, and FIG. 8 is a cross-sectional view taken along the line B-B' of FIG. 5. FIG. 9 is a magnified diagram of part "E" of FIG. 5, and FIG. 10 is a cross-sectional view taken along the line C-C' of FIG. 5.

The bow control apparatus 170 includes the first and second support units 181 and 185, the first and second pressure units 191 and 195, and the first and second adjusting elements 192 and 196.

The first and second support units 181 and 185, which support both ends of the reflecting element 263, include lower portion support elements 182 and 186 to support a lower portion of the reflecting element 263, respectively.

The lower portion support element 182 of the first support unit 181 is installed so as to be fixed to a frame 101, as illustrated in FIGS. 6 and 8, and an upper side of the lower portion support element 182 is aslope formed. Since the upper side of the lower portion support element 182 is aslope formed, the reflecting element 263 that is supported by the upper side of the lower portion support element 182 is also disposed to be sloped, thereby changing a direction of a light beam. Similarly, the lower portion support element 186 of the second support unit 185 is installed so as to be fixed to the frame 101, as illustrated in FIGS. 9 and 10, and an upper side of the lower portion support element 186 is aslope formed.

The first and second pressure units 191 and 195, which pressure the reflecting element 263 to convexly or concavely bow it, pressure the inside and the outside of the reflecting element 263, respectively, based on at least one of the first and second support units 181 and 185. For example, the first and second pressure units 191 and 195 may pressure the inside and the outside of the reflecting element 263, respectively, based on the first support unit 181, as illustrated in FIG. 5, and, below, an explanation is described based on the first and second pressure units 191 and 195 disposed on both sides of the first support unit 181.

The first pressure unit 191 includes a first pressure element 1911 to directly pressure the reflecting element 263 and a first bracket 1912 disposed on the first pressure element 1911, and the second pressure unit 195 includes a second pressure element 1951 to directly pressure the reflecting element 263 and a second bracket 1952 disposed on the second pressure element 1951.

The first and second pressure elements 1911 and 1951, which transmit pressure applied through the first and second adjusting elements 192 and 196 to the reflecting element 263, may prevent damage to the reflecting element 263, which may be occur if the first and second adjusting elements 192 and 196 directly pressure the reflecting element 263.

As illustrated in FIG. 7, one end of the first pressure element 1911 is fixed to the frame 101, and the other end thereof contacts the reflecting element 263 to pressure it. An area 1911A of the first pressure element 1911, which contacts the reflecting element 263, may be formed in a hemisphere shape. Through this, it is possible to prevent a distortion, as well as a bow of the reflecting element 263 pressured by the first pressure element 1911, from occurring. A leaf spring may be used as the first pressure element 1911.

A first end 1912B of the first bracket 1912 is fixed to the frame 101 by inserting a fixing element 284 through a hole of the first pressure unit and into a screw hole 1031 in the frame 101, and a second end thereof 1912A extends to an upper portion of the first pressure element 1911. The first bracket 1912 supports the first adjusting element 192 so that a lower end of the first adjusting element 192 may pressure the upper portion of the first pressure element 1911.

That is, the first pressure element 1911 is pressured by lowering the first adjusting element 192 supported by the first bracket 1912, and the pressured first pressure element 1911 pressures the inside of the reflecting element 263 through the contact area 1911A formed in a hemisphere shape, thereby concavely bowing the reflecting element 263.

Similar to the first pressure element 1911, one end of the second pressure element 1951 is fixed to the frame 101, and the other end thereof contacts the reflecting element 263 to pressure it. An area 1951A of the second pressure element 1951, which contacts the reflecting element 263, may be formed in a hemisphere shape. A leaf spring may be used as the second pressure element 1951.

Similar to the first bracket 1912, one end of the second bracket 1952 is also fixed to the frame 101 by inserting a fixing element 384 through the second pressure unit and into a screw hole 1033 in the frame 101, and the other end thereof extends to an upper portion of the second pressure element 1951 to support the second adjusting element 196.

That is, the second pressure element 1951 is pressured by lowering the second adjusting element 196 supported by the second bracket 1952, and the pressured second pressure element 1951 pressures the outside of the reflecting element 263 through the contact area 1951A formed in a hemisphere shape, thereby convexly bowing the reflecting element 263.

Screws may be used as the first and second adjusting elements 192 and 196. The first and second pressure elements 1911 and 1951 may be pressured by inserting screws in screw holes formed in the first and second brackets 1912 and 1952 and then rotating the screws. The amount of pressure on the first and second pressure elements 1911 and 1951 may be adjusted by adjusting the amount of rotation of the screws.

The first support unit 181 may further include an upper portion support element 183 to support the upper portion of the reflecting element 263, and the second support unit 185 may further include an upper portion support element 187 to support the upper portion of the reflecting element 263.

For example, one end of the upper portion support element 183 of the first support unit 181 is fixed to the frame 101, and the other end thereof supports the upper portion of the reflecting element 263. In order to support the upper portion of the reflecting element 263, as illustrated in FIG. 6, the upper portion support element 183 of the first support unit 181 may include a pressure unit 1831, a holder unit 1833, and a fixing unit 1835.

The pressure unit 1831, as illustrated in FIG. 8, pressures and supports the reflecting element 263 that is aslope supported by the lower portion support element 182. The pressure unit 1831 is connected to the fixing unit 1835, and the fixing unit 1835 is fixed to the frame 101 by inserting a fixing element 184 through a fixing bracket 1932 and into a screw hole 1032 in the frame 101. The pressure unit 1831 pressures the reflecting element 263 by using elasticity of the material of the pressure unit 1831, based on the fixing unit 1835 fixed to the frame 101. An area of the pressure unit 1831, which contacts the reflecting element 263, may be formed in a hemisphere shape in consideration of pressure applied to the reflecting element 263.

The holder unit 1833 prevents the reflecting element 263 from separating from the first support unit 181 due to an external force or the like. The holder unit 1833 has a structure for contacting the side of the reflecting element 263. For example, as illustrated in FIG. 6, the holder unit 1833 may have a shape in which one end thereof is bent, that is, a shape. The holder unit 1833 is disposed parallel with the pressure unit 1831 in the direction of the length of the reflecting element 263, and the other end thereof is connected to the fixing unit 1835.

Similar to the upper portion support element 183 of the first support unit 181, the upper portion support element 187 of the second support unit 185 may include a pressure unit 1871, a holder unit 1873, and a fixing unit 1875, as illustrated in FIG. 9.

The pressure unit 1871 pressures and supports the reflecting element 263 that is aslope supported by the lower portion support element 186, as illustrated in FIG. 10. The pressure unit 1871 is connected to the fixing unit 1875, and the fixing unit 1875 is fixed to the frame 101 by a fixing element 188. The pressure unit 1871 pressures the reflecting element 263 by using elasticity of the material of the pressure unit 1871, based on the fixing unit 1875 fixed to the frame 101 by inserting the fixing element 188 through the fixing unit 1875 and into a screw hole 1034 in the frame 101. An area of the pressure unit 1871, which contacts the reflecting element 263, may be formed in a hemisphere shape.

As illustrated in FIG. 9, the holder unit 1873 may have a shape in which one end thereof is bent to contact the side of the reflecting element 263. The holder unit 1873 is disposed parallel with the pressure unit 1871 in the direction of the length of the reflecting element 263, and the other end thereof is connected to the fixing unit 1875.

Referring back to FIG. 6, the upper portion support element 183 of the first support unit 181 is disposed between the first and second pressure elements 1911 and 1951, and may be connected to the first and second pressure elements 1911 and 1951. For example, the first and second pressure elements 1911 and 1951 and the upper portion support element 183 disposed between them may be formed in one body and in a form of a leaf spring that is capable of providing elasticity to the reflecting element 263.

The first and second brackets 1912 and 1952 may be formed in one body. For example, the first and second brackets 1912 and 1952 may be formed in one body together with the fixing bracket 1932 disposed between them. At this time, the fixing bracket 1932 may be fixed to the upper portion support element 183 of the first supporting element 181 by the fixing element 184.

Figure 11:
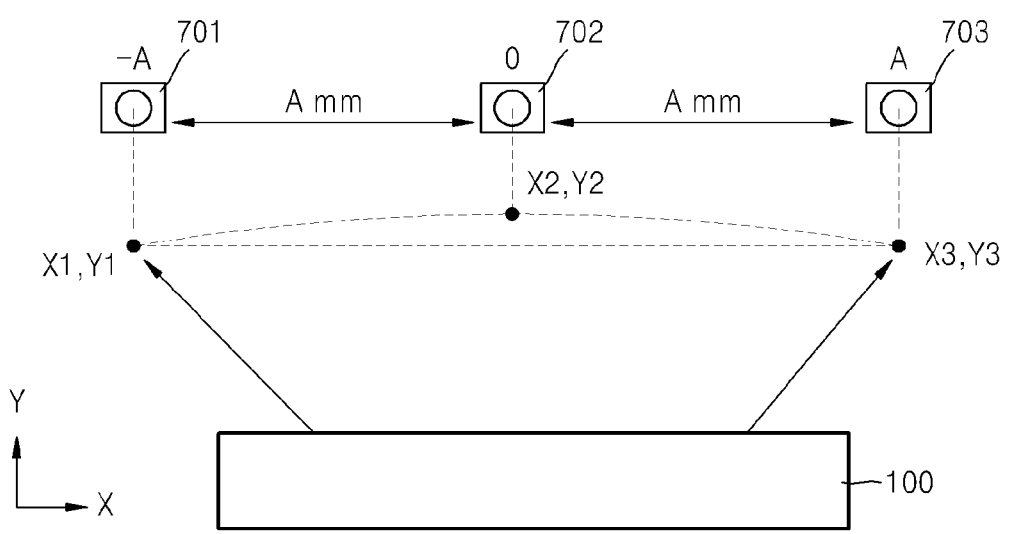
FIG. 11 is a diagram schematically illustrating a process of measuring a bow value of a scanning line of the light scanning unit of FIG. 1.

FIG. 11 is a diagram schematically illustrating a process of measuring a bow value of a scanning line of the light scanning unit 100 of FIG. 1.

Referring to FIG. 11, before the light scanning unit 100 is installed in an image forming apparatus, the bow value of the scanning line may be measured by using measuring equipment and then corrected.

Three charge-coupled device (CCD) image sensors 701, 702, and 703 may be used as the measuring equipment to measure the bow value of the scanning line.

The three CCD image sensors 701, 702, and 703 may be located in the center and both ends of the scanning line of the light scanning unit 100 to measure X-axis coordinates and Y-axis coordinates of the scanning line.

That is, the CCD Image sensor 701 located in the left side of the scanning line measures (X1, Y1) coordinates of the scanning line, the CCD Image sensor 702 located in the center of the scanning line measures (X2, Y2) coordinates of the scanning line, and the CCD Image sensor 703 located in the right side of the scanning line measures (X3, Y3) coordinates of the scanning line. Intervals between the CCD image sensors 701, 702, and 703 may be changed according to a width of a recording medium. For example, when the size of the recording medium is A3 size, intervals A between the CCD image sensors 701, 702, and 703 may be in the range of about 130 mm to 140 mm.

It is possible to obtain the bow value BOW by applying coordinates measured in this manner to the following equation 1.

$$BOW = Y2 - (Y1 + Y3)/2 \quad (1)$$

When the bow value BOW is a positive number, the scanning line is convexly bowed since Y2 is larger than an average value of Y1 and Y3. On the other hand, when the bow value is a negative number, the scanning line is concavely bowed since Y2 is smaller than the average value of Y1 and Y3.

Based on this bow value BOW, it is possible to let the bow value be close to "0 by bowing the reflecting element in the opposite direction by adjusting the first and second adjusting elements 192 and 196. For example, when a screw of which a pitch value is 0.45 mm is used as the first and second adjusting elements 192 and 196, the first and second pressure elements 1911 and 1951 may be pressured by 0.45 mm when the screw makes one revolution.

Figure 12:
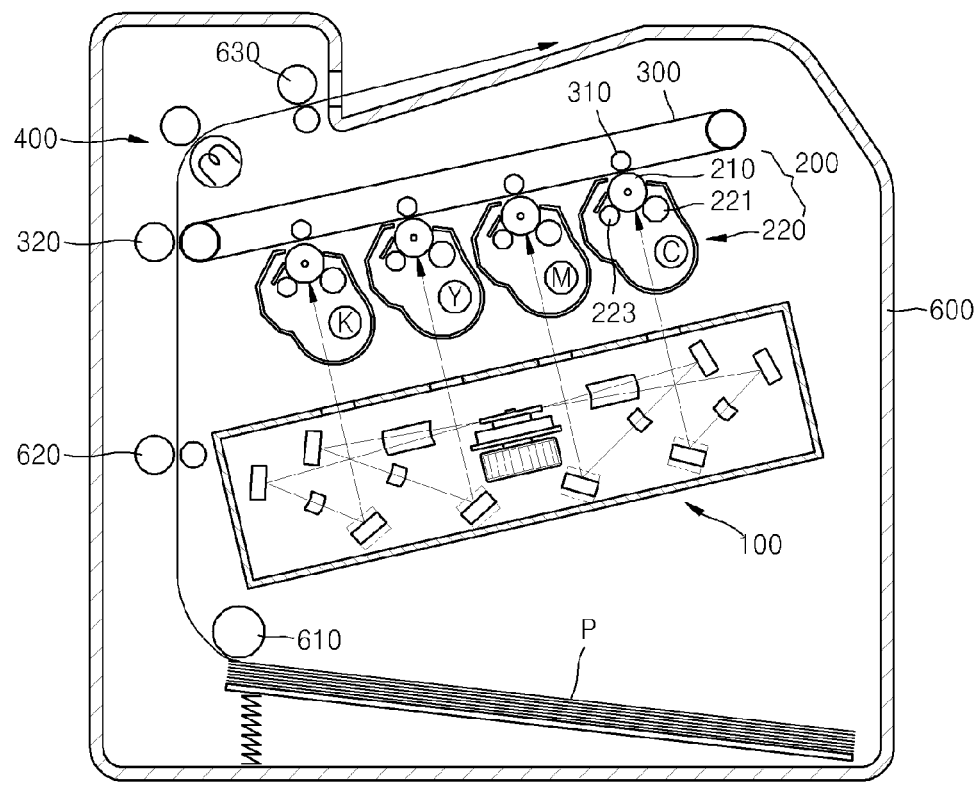
FIG. 12 is a view illustrating an electrophotographic image forming apparatus employing the light scanning unit of FIG. 1, according to an embodiment of the present general inventive concept.

FIG. 12 is a view illustrating an electrophotographic image forming apparatus employing the light scanning unit 100, according to an embodiment of the present general inventive concept.

The electrophotographic image forming apparatus includes the light scanning unit 100 described above, a plurality of developing devices 200, an intermediate transfer belt 300, first and second transfer rollers 310 and 320, and a fixing device 400 that are accommodated in a housing 600.

In order to print a color image, the light scanning unit 100 scans a plurality of light beams, and the developing devices 200, one for each of the colors to be printed, may be disposed to correspond to the plurality of light beams. For example, the light scanning unit 100 may scan four light beams corresponding to black (K), magenta (M), yellow (Y), and cyan (C), respectively. The light scanning unit 100 is the same as that described above, and thus, a repeated description thereof is omitted.

The developing devices 200 each include a photoconductor 210, that is, an image receptor, on which an electrostatic latent image is formed and a developing unit 220 to develop the electrostatic latent image. The developing unit 220 may be formed for each K, M, Y, and C color.

The photoconductor 210 may be a photosensitive drum in which a photosensitive layer having a predetermined thickness is formed on an outer circumference of a cylindrical metal pipe. The outer circumference of the photosensitive drum is a surface that is to be exposed. The photosensitive drum is exposed out of the developing unit 220. The photosensitive drums of the photoconductor 210 are arranged spaced apart from one another at predetermined intervals in a sub-scanning direction. A photosensitive belt may be employed instead of the photosensitive drum as the photoconductor 210.

A charge roller 223 is disposed on a portion of the outer circumference of the photoconductor 210 upstream from a region of the outer circumference that is to be exposed to the light scanning unit 100. The charge roller 223 is a charging unit that contacts the photoconductor 210 and rotates to apply a uniform charge to the surface of the photoconductor 210. A charge bias is applied to the charge roller 223. A corona charging unit (not shown) may be used instead of the charge roller 223. A developing roller 221 supplies toner adhered to its outer circumference to the photoconductor 210. A development bias is applied to the developing roller 221 to supply the toner to the photoconductor 210. Although it is not illustrated in FIG. 11, the developing units 220 may further include a supply roller to allow toner contained in the developing units 220 to adhere to the developing roller 221, a regulation unit to regulate an amount of the toner adhered to the developing roller 221, and an agitator to transfer the toner contained in each of the developing units 220 to the supply roller and/or the developing roller 221.

The intermediate transfer belt 300 is disposed to face a region of the outer circumference of the photoconductor 210 exposed out of the developing devices 200. The intermediate transfer belt 300 is an example of an intermediate transfer body to transfer toner images of the photoconductors 210 to a recording medium P. An intermediate transfer drum may be used instead of the intermediate transfer belt 300 as the intermediate transfer body. The intermediate transfer belt 300 circulates by contacting the photoconductors 210. The first transfer rollers 310 are disposed to face the photoconductors 210 with the intermediate transfer belt 300 interposed therebetween. A first transfer bias is applied to each of the first transfer rollers 310 so as to transfer the toner images of the photoconductors 210 to the intermediate transfer belt 300 to form a color toner image.

The second transfer roller 320 is disposed to face the intermediate transfer belt 300, and the recording medium P may pass between the second transfer roller 320 and the intermediate transfer belt 300. A second transfer bias is applied to the second transfer roller 320 so as to transfer the color toner image of the intermediate transfer belt 300 to the recording medium P.

A color image forming process that may be performed by the electrophotographic image forming apparatus configured as described above is as follows.

The photoconductor 210 of each developing device 200 is charged to have a uniform electric potential by a charge bias applied to the charge roller 223.

The light scanning unit 100 exposes the surface of the photosensitive drum 210 in a lengthwise direction of the photoconductor 210, that is, in a main scanning direction. The exposed surface of the photoconductor 210 moves in a sub-scanning direction according to rotation of the photoconductor 210. Thus, a two-dimensional electrostatic latent image is formed on the exposed surface of each of the four photoconductors 210 according to image information of K, M, Y, and C colors. In this regard, the sub-scanning direction is a direction perpendicular to the main scanning direction. The four developing units 220 supply K, M, Y, and C toners to the photoconductors 210, respectively, so as to form K, M, Y, and C toner images.

The K, M, Y, and C toner images formed on the photoconductors 210 are transferred onto the intermediate transfer belt 300 by overlapping each other due to the first transfer bias applied to the first transfer rollers 310, thereby forming a color toner image.

A medium that finally receives the color toner image, for example, the recording medium P, is transferred between the intermediate transfer belt 300 and the second transfer roller 320 by a pickup roller 610 and transfer rollers 620. The color toner image on the intermediate transfer belt 300 is transferred onto the recording medium P due to the second transfer bias applied to the second transfer roller 320. The color toner image transferred onto the recording medium P is maintained on a surface of the recording medium P due to an electrostatic force. The recording medium P onto which the color toner image is transferred is sent to the fixing device 400. The color toner image transferred onto the recording medium P is fixed on the recording medium P by receiving heat and pressure from a fixing nip of the fixing device 400. The recording medium P after being subjected to a fixing process is ejected out of the electrophotographic image forming apparatus by eject rollers 630.

Although embodiments are related to a color image forming apparatus employing a developing unit forming a color image by using an electrophotographic method, in which C, M, Y, and K toners are used, the embodiments of the present general inventive concept are not limited thereto. A color image forming apparatus employing a light scanning unit according to the present general inventive concept may be applied to an image forming apparatus that forms an image on a recording medium by using a developing unit forming a single color image by using the electrophotographic method.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A light scanning unit comprising:
   a light source to emit a light beam according to an image signal;
   a deflector to deflect the light beam emitted from the light source in a main scanning direction;
   an imaging lens to focus the light beam deflected by the deflector onto a photoconductor;
   at least one reflecting element to reflect the light beam that has passed through the imaging lens; and
   a bow control apparatus to correct a bow of a scanning line of the light beam,
   the bow control apparatus comprising:
      first and second support units to support both ends of the reflecting element;
      first and second pressure units disposed at one end of the reflecting element to pressure an inside and an outside of the reflecting element, respectively, with respect to one of the first and second support units; and
      first and second adjusting elements to adjust the amount of pressure of the first and second pressure units, the bow control apparatus convexly or concavely bows the at least one reflecting element.

2. The light scanning unit of claim 1, wherein the first pressure unit comprises a first pressure element to directly pressure the reflecting element and a first bracket that is fixed to a frame and extends to an upper portion of the first pressure element, and the second pressure unit comprises a second pressure element to directly pressure the reflecting element and a second bracket that is fixed to the frame and extends to an upper portion of the second pressure element, and
   wherein the first adjusting element is installed in the first bracket to pressure the upper portion of the first pressure element, and the second adjusting element is installed in the second bracket to pressure the upper portion of the second pressure element.

3. The light scanning unit of claim 2, wherein areas of the first and second pressure elements, which contact the at least one reflecting element, are formed in a hemisphere shape.

4. The light scanning unit of claim 2, wherein the first and second pressure elements are leaf springs.

5. The light scanning unit of claim 2, wherein the first and second adjusting elements are screws and adjust the amount of pressure from the first and second pressure units through the rotation of the screws.

6. The light scanning unit of claim 2, wherein the first and second brackets are formed in one body.

7. The light scanning unit of claim 1, wherein each of the first and second support units comprises a lower portion support element to support a lower portion of the reflecting element and an upper portion support element to support an upper portion of the reflecting element.

8. The light scanning unit of claim 7, wherein the upper portion support element comprises a pressure unit to pressure the reflecting element, and a holder unit to prevent the reflecting element from separating from the first or second support unit.

9. The light scanning unit of claim 7, wherein the upper portion support element is disposed between the first and second pressure units, and is connected to the first and second pressure units.

10. The light scanning unit of claim 9, wherein the first and second pressure units and the upper portion support element disposed between them are formed in one body of a leaf spring.

11. An image forming apparatus comprising:
a photoconductor;
a light scanning unit, which forms an electrostatic latent image on the photoconductor, comprising:
   a light source to emit a light beam according to an image signal;
   a deflector to deflect the light beam emitted from the light source in a main scanning direction;
   an imaging lens to focus the light beam deflected by the deflector onto the photoconductor;
   at least one reflecting element to reflect the light beam that has passed through the imaging lens; and
   a bow control apparatus to correct a bow of a scanning line of the light beam, the bow control apparatus comprising:
      first and second support units to support both ends of the reflecting element;
      first and second pressure units disposed at one end of the reflecting element to pressure an inside and an outside of the reflecting element, respectively, with respect to one of the first and second support units; and
      first and second adjusting elements to adjust the amount of pressure of the first and second pressure units, the bow control apparatus convexly or concavely bows the at least one reflecting element, the image forming apparatus further comprising:
a developing unit for developing the electrostatic latent image.

12. A bow control apparatus of a light scanning unit comprising:
   a first support unit disposed on a first side of a reflecting element and a second support unit disposed on a second side of the reflecting element to support the reflecting element; and
   a first pressure unit disposed on a first side of the first support unit and a second pressure unit disposed on a second side of the first support unit to pressure the reflecting element, the first and second pressure units being disposed at one end of the reflecting element including first and second adjusting elements, respectively, to adjust the amount of pressure to concavely and convexly bow the reflecting element to correct a bow of a scanning line formed on a photoconductor.

13. The bow control apparatus of claim 12, wherein the first adjusting element adjusts the first pressure unit so that the first pressure unit pressures an inside of the reflecting element to concavely bow the reflecting element.

14. The bow control apparatus of claim 12, wherein the second adjusting element adjusts the second pressure unit so that the second pressure unit pressures an outside of the reflecting element to convexly bow the reflecting element.

15. The bow control apparatus of claim 12, wherein an upper side of each of the lower portion support elements being a slope formed.

16. The bow control apparatus of claim 12, wherein the first pressure unit includes a first pressure element to directly pressure the reflecting element and a first bracket disposed on the first pressure element, and the second pressure unit includes a second pressure element to directly pressure the reflecting element and a second bracket disposed on the second pressure element.

17. The bow control apparatus of claim 16, wherein a first end of the first pressure element is fixed to a frame of the light scanning unit and a second end of the first pressure element contacts the reflecting element to pressure it.

18. The bow control apparatus of claim 17, wherein an area of the first pressure element which contacts the reflecting element is formed in a hemisphere shape.

19. The bow control apparatus of claim 18, wherein the first pressure element is pressured by lowering the first adjusting element so that the first pressure element pressures an inside of the reflecting element through the area formed in a hemisphere shape.

20. The bow control apparatus of claim 16, where a first end of the second pressure element is fixed to a frame of the light scanning unit and a second end of the second pressure element contacts the reflecting element to pressure it.

21. The bow control apparatus of claim 20, wherein an area of the second pressure element which contacts the reflecting element is formed in a hemisphere shape.

22. The bow control apparatus of claim 21, wherein the second pressure element is pressured by lowering the second adjusting element so that the second pressure element pressures an outside of the reflecting element through the area formed in a hemisphere shape.

23. The bow control apparatus of claim 16, wherein the first pressure element and the second pressure element are leaf springs.

24. The bow control apparatus of claim 12, wherein the first and second adjusting elements are screws.

25. The bow control apparatus of claim 24, wherein the first and second pressure units include first and second pressure elements, respectively, and first and second brackets, respectively, the pressure units being pressured by rotating the screws, the amount of pressure on the first and second pressure elements being adjusted by adjusting the rotation of the screws.

26. A bow control apparatus of a light scanning unit, the bow control apparatus comprising:
   first and second support units fixed to a frame of the light scanning unit to respectively support both ends of a reflecting element;
   first and second pressure units disposed at one end of the reflecting element to respectively pressure an inside and an outside of the reflecting element with respect to one of the first and second support units; and
   first and second adjusting elements to respectively adjust the amount of pressure of the first and second pressure units to convexly or concavely bow the reflecting element.

* * * * *